United States Patent
Vempati et al.

(10) Patent No.: US 6,953,763 B2
(45) Date of Patent: *Oct. 11, 2005

(54) SOLID SUPPORT STABILIZED MN(III) AND MN(VII) AND METHOD OF PREPARATION

(75) Inventors: Rajan K. Vempati, Plano, TX (US); David Y. Son, Plano, TX (US)

(73) Assignee: ChK Group, Inc., Plano, TX (US)

( * ) Notice: Subject to any disclaimer, the term of this patent is extended or adjusted under 35 U.S.C. 154(b) by 109 days.

This patent is subject to a terminal disclaimer.

(21) Appl. No.: 10/430,500

(22) Filed: May 6, 2003

(65) Prior Publication Data

US 2004/0224836 A1 Nov. 11, 2004

(51) Int. Cl.⁷ ............................................. B01J 29/06
(52) U.S. Cl. ........................... 502/66; 502/64; 502/80; 502/84; 502/74; 423/605
(58) Field of Search .............. 502/60, 64, 80, 502/84, 324, 66, 74; 423/605

(56) References Cited

U.S. PATENT DOCUMENTS

| | | | | |
|---|---|---|---|---|
| 4,353,815 A | * | 10/1982 | Antos | 502/328 |
| 4,536,183 A | * | 8/1985 | Namnath | 8/107 |
| 4,731,196 A | * | 3/1988 | Staton et al. | 252/184 |
| 5,175,366 A | * | 12/1992 | Ebata et al. | 564/126 |
| 5,232,886 A | * | 8/1993 | Yoshimoto et al. | 502/84 |
| 5,414,201 A | * | 5/1995 | Greene | 588/206 |
| 5,589,147 A | * | 12/1996 | Farnos et al. | 423/239.2 |
| 5,716,588 A | * | 2/1998 | Vergani et al. | 422/177 |

* cited by examiner

Primary Examiner—Christina Johnson
(74) Attorney, Agent, or Firm—Charles D. Gunter, Jr.

(57) ABSTRACT

The instant method produces Mn(III) and Mn(VII) in stabilized form. Stabilized Mn(II), Mn(III), Mn(IV), and Mn(VII) are also formed on solid supports. Solid supported Mn(VII) is prepared by first reacting an H-saturated support with Mn(II) in solution. Mn(III) substituted Fe oxide coated on natural zeolite (FMNZ) is prepared by reacting Mn(II) and Fe(III) to a natural zeolite equilibrated with 2 N NaoH. The resulting Mn(IV) and Mn(III) oxide is precipitated from solution and dried to give supported Mn(IV) or Mn(III). The Mn(IV) material is reacted with 1,4-phenylenediamine (PDA) to form supported Mn(VII). In another aspect of the invention, Mn(II) is synthesized by adding 1,2-phenylenediamine dihydrochloride to uncoated and clay and-zeolite coated $MnO_2$. Mn(II) and Mn(III) are synthesized by adding 1,2-phenylenediamine dihydrochloride and 1,4-phenylenediamine dihydrochloride, respectively, to uncoated Mn containing clays, and clay and-zeolite coated $MnO_2$.

21 Claims, 2 Drawing Sheets

US 6,953,763 B2

SOLID SUPPORT STABILIZED MN(III) AND MN(VII) AND METHOD OF PREPARATION

BACKGROUND OF THE INVENTION

1. Field of the Invention

The present invention relates to the stabilization of Mn(II), Mn(III), Mn(IV), and Mn(VII) on solid supports, and to the use these solid supported oxidation states of Mn in various industrial applications.

2. Description of the Prior Art

The metallic element manganese, (Mn), in its various forms, is presently used in a variety of industrial settings. For example, $KMnO_4$-coated zeolites have been used in the removal of mercaptans and other malodorous compounds from the environment. Odor removal or neutralization has become increasing important in the modern industrialized environment, due at least in part to the increased production and widespread use of industrial chemicals. Many of these chemicals have disagreeable odors that are unbearable to human beings. Depending on their chemical characteristics and intensity, these odors can be a nuisance or cause adverse health effects particularly if exposure to them is prolonged. Often these health effects are non-specific symptoms, i.e., headaches, nausea, reflex nausea, gastrointestinal (G.I.) distress, fatigue, eye irritation, throat irritation, shortness of breath, runny nose, sleep disturbance, inability to concentrate, classical stress response, etc., which may or may not be directly linked to a specific chemical or exposure event. Therefore, a need exists to remove these malodors both for aesthetic and/or health reasons.

In the discussion which follows, odor removal is used as one example to explain the utility of the compositions and method of the present invention. In order to explain the benefits obtained by the methods and compositions of the invention, it is instructive to classify some malodors based upon their chemistry. These malodors are usually classified into three types: 1) aliphatic acids, 2) amines, and 3) sulfur compounds.

The odor of aliphatic acids is sharp and irritating, resembling formic and acetic acid but unique to butyric, valeric, and caproic acid. The higher acids have negligible odor due to their low volatility.

Aromatic amines are generally very toxic and readily adsorbed through the skin, often with fatal results. Methylamines and ethylamines smell more like ammonia, whereas higher alkylamines have a fishy odor.

Major sources of organosulfur compounds in the atmosphere are microbial degradation, wood pulping, starch manufacturing, sewage treatment, poultry processing wastes (e.g., methionine and cysteine, S-containing amino acids), and petroleum refining. Methanethiol and other light alkylthiols are fairly common air pollutants that have "ultragarlic" odors. Gaseous methanethiol and volatile liquid ethanethiol are used as odorant leak detecting additives for natural gas, propane, and butane and are employed as intermediates in pesticide synthesis. The substitution of alkyl or aryl hydrocarbon groups such as phenyl and methyl for H on $H_2S$ leads to mercaptans (R—SH) and thioesters (R—S—R).

Due to the intensely foul odor of mercaptans, considerable research is being directed towards the removal of these compounds in a safe and efficient manner. Commonly reported methods of removing mercaptans employ the use of an oxidation reagent, including diatomic oxygen, ozone, hydrogen peroxide, and various metal permanganates (Hudlicky, 1990). In most of these cases, the mercaptans are oxidized to the disulfides or sulfonic acids, considerably less malodorous compounds. For example, the oxidation of 2-mercaptoethanol to the disulfide with oxygen in the presence of Co(II)-4,4',4'',4'''-tetrasulfophthalocyanine (CoTSP) has been reported as shown in the following equation (Leung and Hoffman, 1988):

(1)

$$4\,HOC_2H_4S^- + O_2 + 2\,H_2O \xrightarrow{CoTSP} 2\,(HOC_2H_4S)_2 + 4\,OH^-$$

Areas of particular concern for mercaptan removal include industrial waste water treatment as well as municipal drinking water treatment. The majority of chemical oxidants are relatively expensive. The presence of high concentrations of mercaptans, particularly in various industrial waste water streams, and the likelihood of increasingly strict environmental regulations makes the search for more efficient and inexpensive oxidants a significant priority.

Several technologies have been proposed for the removal of malodors depending upon the particular chemistry involved. For example, materials that contain Lewis acid sites (i.e., H-ZSM-5, alumina, $MnO_2$, etc) can efficiently remove amine-based malodors. However, sulfur-containing malodors have only been successfully removed using oxidants and removal by C has been documented in the literature (see below).

The following materials are currently being used in industrial applications with the noted limitations:

(1) Activated carbon/saw dust/fiber-coated with $MnO_2$:

Activated carbon/saw dust/fiber coated with $MnO_2$ has been used to remove mercaptan odors (Turk et al., 1973; Sarkkinen, 1990; Yoshida et al., 1992; Vempati 2002). The fibers generally used are Zn phosphate or ZnS doped with Mn (Iannicelli, 1990; Yamamoto et al., 1991; Hirukawa et al., 1998). Increase in humidity and/or temperature can decrease the effectiveness of the activated carbon and saw dust due to a decrease in available surfaces for reaction. Furthermore, the instability of activated C at high temperature may reduce its activity.

Vempati (2002) has demonstrated the removal of mercaptan odor using >3% amorphous C present in the rice hull ash. However rice hull ash with >10% amorphous C worked best. (Vempati, R. K. 2002. *Composition and Method of Forming Siliceous Ash From Siliceous Waste Material*, U.S. Pat. No. 6,444,186).

(2) $MnO_2$:

$MnO_2$ has been used for the removal of malodors. (Mitrofanov et al., 1969; Cvjeticanin et al., 1982; Iannicelli et al., 1985; Lutz et al., 1986; Futomi et al., 1990; Iannicelli, 1990; Tetsuya and Shigeo, 1990; Hideo et al., 1991; Yoshimitsu, 1991; Norikazu et al., 1992; Masahiro, 1994; Kimiyasu et al., 1996; Mazgarov et al., 1997; Sasaki et al., 1997; Chu and Wu, 1998; Honda et al., 1998; Firouzabadi et al., 1999). In the above studies, amine odors were removed at room temperature but the removal of sulfides and mercaptan odors required either an oxidant or high temperature (in the range of 100 to 400° C.).

(3) $KMnO_4$-coated zeolites:

Potassium permanganate ($KMnO_4$)-coated zeolites/clays/fibers have been used for the preservation and deodorization of flowers, fruits and vegetables; stench prevention in sludges, sewages and industrial wastewater; asphalt treatment plant and food processing, and removal of mercaptans in oil and gas (Behrens, 1933; Kostrikov et al., 1978; Imafuku et al., 1979; Botkin et al., 1981, Tiwari and Verma, 1983; Yoshioka and Tanaka, 1987; Kobayashi et al., 1987; Kawamoto et al., 1989; Sarkkinen, 1990; Imamura and Imose, 1992; England, 1995; Firouzabadi et al., 1989, Yaide, 2001; Handa and Yasuhiro; 2002). The preservation of the horticultural crops was by degradation of the ethylene gas released, and maintenance of the moisture and atmospheric composition (Saburu, 1980; Paulo, 2000).

(4) $H_2O_2$ process:

Sulfur-containing compounds are oxidized by $H_2O_2$ to various products depending on the pH and catalyst (Equations 2–5). Mercaptans can be converted to disulfides (Equation 2) or sulfonic acids (Equation 3). Sulfides are converted to sulfoxides (Equation 4), while disulfides are converted to sulfonic acids under strongly acidic conditions (Equation 5).

mercaptans

(2)

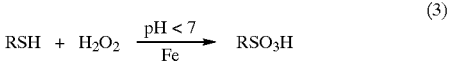
(3)

sulfides

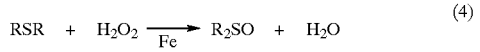
(4)

disulfides

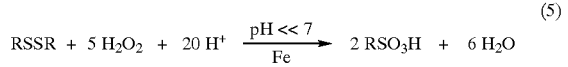
(5)

The use of $H_2O_2$ may not be feasible in reactions involving gases and organic solvents. Furthermore, $H_2O_2$ is hazardous and fairly expensive.

Applicant's invention is directed toward a process for the production of Mn(II), Mn(III) and Mn(VII) in stabilized oxidation states on solid supports, and to the use these solid supported oxidation states of Mn in various industrial applications such as odor removal. Applicant is unaware at this time of any relevant prior art processes for producing solid supported Mn(II), Mn(III) or Mn(VII). There is little to no information in the literature regarding the stability of solid supported Mn(III) and Mn(VII).

SUMMARY OF THE INVENTION

A method is shown for producing solid supported Mn(III) and Mn(VII). In the course of the method, Mn(IV) and Mn (II) are also produced. Solid supported Mn(VII) is prepared by first reacting an H-saturated support with Mn(II) in solution. The resulting Mn(IV) oxide can then be precipitated from solution. A portion of the material can be dried to give supported Mn(IV). An additional portion is reacted with a suitable amine, such as 1,4-phenylenediamine (PDA), to form supported Mn(VII) which results in an observed violet color formation in the material so formed.

In a particularly preferred method, the solid supported Mn(VII) is prepared by first adding a known amount of an H-saturated support to a beaker containing containing Mn(II) solution and the suspension equilibrated for 30 min by stirring magnetically. The pH is then raised to 13.1 to form the Mn(IV) oxide which can be precipitated from solution. The formation of the Mn(IV) oxide is observed by a brown coloration of the suspension, and the material is then reacted with 2% 1,4-PDA to form supported Mn(VII) which results in an observed violet color formation in the material so formed.

In another aspect of the invention, Mn(II) was synthesized by adding 1,2-phenylenediamine dihydrochloride to untreated clays and zeolites and clay-and zeolite-coated $MnO_2$. The color of the resulting material was red/lavender. Mn(III) was similarly synthesized by adding 1,4-phenylenediamine dihydrochloride to uncoated and clay-and zeolite-coated $MnO_2$. The color of the coated Mn oxide was green to turquoise. Additionally, it can be prepared by bubbling ozone or $H_2O_2$ to a solution containing Mn(VII)-coated material.

Additional objects, features and advantages will be apparent in the written description which follows.

DETAILED DESCRIPTION OF THE INVENTION

Figure 1:
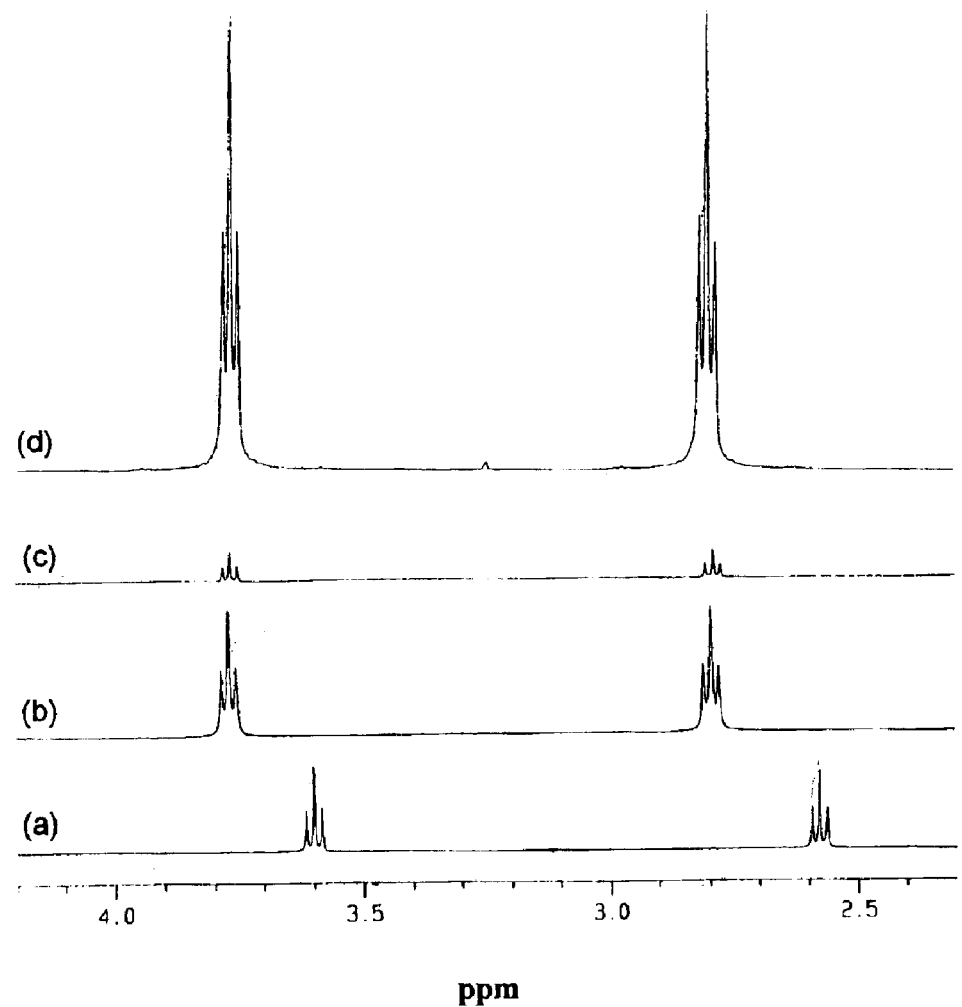
FIG. 1 is an NMR Spectrogram showing the removal of mercaptan in $D_2O$ after treatment with either Mn(VII)-coated H-Z5M5 or $KMnO_4$-coated zeolite 13X.
Figure 2:
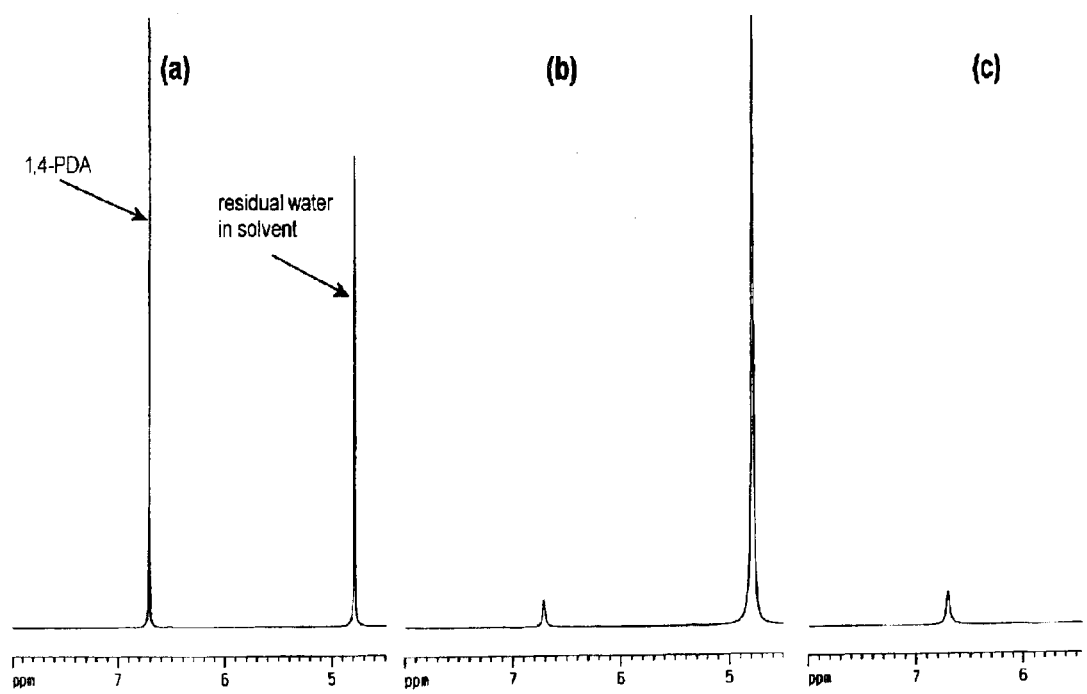
FIG. 2 is an NMR Spectrogram showing the consumption of PDA during the preparation of Mn(VII).

Mn Oxidation States and Color:

In order to better understand the basis for producing the various supported oxidation states of Mn of the invention, it is important to understand the nature of the various Mn oxidation states and the characteristic colors of the various states. In nature, Mn primarily exists as Mn(II) and Mn(IV), whereas Mn(III) and Mn(VII) tend to dis-proportionate into the above mentioned stable oxidation states. In minerals, a Mn(II) octahedral coordinate state is identified by its visible and near infrared absorption spectrum, consisting of a sharp band near 412 nm and two weak bands at longer wavelength (Rossman, 1988). There are several reports concerning the stabilization of various Mn oxidation states in solution but none on stabilization on the solid phase. In the chemical literature there are references of the predominant mineral colors due to Mn oxidation states. For example, octahedral Mn(II) in a mineral is pink but in tetrahedral sites it is a yellow-green color. Mn(III), when present in octahedral sites is either red/lavender or green/turquoise (Vempati et al., 1995). Mn(IV) minerals are brown to black and Mn(VII) is violet (Rossman, Online, 2001).

There is little to no information in the literature regarding the stability of solid supported Mn(III) and Mn(VII). One novel aspect of the present invention is the successful stabilization of Mn(II), Mn(III), and Mn(VII) on solid supports. The following stabilized oxidation states of Mn have been observed in a study of clay and phenylenediamine (PDA) interactions. The studied clay was an expansive type (montmorillonite) mined from Gonzales, Tex. which contained Mn(IV) either in the structure and/or as Mn-oxide impurities. The percent Mn present in the clay was 0.25%. The various supported Mn oxidation states obtained were:

a). Mn(II): This was synthesized by adding 1,2-phenylenediamine dihydrochloride to the $MnO_2$ and/or Gonzalez clays. Color of the mineral: pink, red or lavender.

b). Mn(III): This was synthesized by adding 1,4-phenylenediamine dihydrochloride to $MnO_2$ and/or Gonzalez clays. Also, it can be prepared by bubbling ozone or adding $H_2O_2$ to a solution containing degraded PDA and Mn(VII)-coated material. Color of the mineral: green or turquoise.

c). Mn(IV): This is the original Mn oxidation state in Gonzalez clays. Color of the mineral: brown to black depending on crystallinity and amount of Mn(IV) present.

d). Mn(VII): This is synthesized by adding 1,4-phenylenediamine to MnO$_2$ and/or Gonzalez clays. Color of the mineral: violet.

Chemistry of Phenylenediamine:

Applicant's present invention is based, in part, upon the discovery that phenylenediamine (PDA) was the reagent responsible for the preparation of the various Mn oxidation states. Phenylenediamine (PDA) has a structure as shown below. The o-(1,2-), m-(1,3-), and p-(1,4-) isomers are inexpensive and readily available in large quantities. The solubilities of these compounds in water are 3.0, 25, and 3.8 g per 100 mL, respectively.

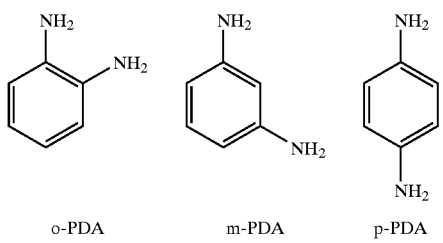

Structure of Phenylenediamine (PDA) Isomers

Although PDA is the preferred reagent used in the method of the invention due, in part, to its availability and cost, it will be understood by those skilled in the art that other amines may be utilized, as well. For example, such amines are represented by the general formula $R(NH_2)_n$, representing a mono- or multi-amine-substituting organic compound where $n \geq 1$, and R=any alkyl or arylorganic moiety.

Solid Support Materials:

In Applicant's invention, various oxidation states of Mn are stablized on the solid phase. The following support materials were used to prepare the various stable (solid-supported) oxidation states of Mn:

(1). Hydrophobic ZSM-5 materials:

Commercial H-ZSM-5: This is a hydrophobic zeolite purchased from Zeolyst International. The $SiO_2/Al_2O_3$ molar ratio is 40. The pore size of this zeolite is approximately 4 to 5 Å. Na-ZSM-5 was also manufactured by a template free process using rice hull ash as the starting material (Vempati, 2002). The amount of Na$^+$ present is <2%. $SiO_2/Al_2O_3$=40. The Na-ZSM was converted to H-ZSM by a process discussed below.

(2). H-saturated support material:

H-saturated zeolite and clay was prepared by shaking the zeolite or clay with 1 M $NH_4Cl$ solution (solid to solution ratio of 1:10) for 30 mins and filtering the suspension. This process was repeated thrice. The excess of salts was then be washed with distilled water until it was Cl$^-$ free (tested with AgNO$_3$). The filtrate was dried in an oven at 500° C. for 4 hrs to produce the H-saturated support material.

Another H-saturated support material was prepared as follows: In a 2-L flask, one lb of zeobrite 1430S, was treated with 500 mL of 2N NaOH solution for one hr at 95° C. using a rotary evaporator. Then, the supernatant was decanted and the solid was dried at 180° C. for three hrs. The dried zeolite was treated with a Fe—Si—Mn mixture. The composition of the mixture was 200 mL of FeCl$_3$ (40% Fe) and 16 g of MnCl$_2$ and 24 g of Na$_2$SiO$_3$. The final volume of the mixture was brought up to 500 mL by adding 300 mL of distilled water. The resulting mixture was added to the dried zeolite and swirled using a rotary-evaporator for one hr at 95° C. Subsequently, the suspension was dried at 180° C. for four hrs. The coated sample was cooled, washed thoroughly with distilled water and dried at 180° C. for three hrs. The oxidation state of Mn in the Fe oxide substituted natural zeolite (FMNZ) is three (Vempati et al., 1995).

Synthesis of Mn(VII) using natural zeolites:

As discussed further under the "Preparation" section below, the dried coated sample was treated with 2% 1,4 PDA solution for one hr at 70° C. to make Mn(VII) coated zeolite. The violet colored sample was washed of excess PDA using distilled water and dried at 100° C.

(3). Zeolite 13X:

Zeolite 13X is a hydrophilic zeolite purchased from PQ Corporation. The cation exchange capacity of this zeolite is 450 cmol kg$^{-1}$. The amount of Na present is 11%. The pore size of the zeolite is 8 to 9 Å.

(4). Clays:

L 10 Bentonite Clay (Ca-Saturated): This is montmorillonitic clay procured from Southern Clays, Gonzales, Tex. The amount of Ca$^{2+}$ present in the clay is 0.1%.

Preparation of Solid Supported Mn(VII):

A preferred method of producing various oxidation states of Mn stabilized on the solid phase will now be described. Solid supported Mn(VII) was prepared as follows. A known amount of support material was added to a beaker containing Mn(II) solution and the suspension was equilibrated for 30 min by magnetic stirring. Then the pH was raised to 13.1 to form the Mn(IV) oxide, observed by a brown coloration of the suspension. It is essential to precipitate the Mn in its oxide forms; otherwise, the Mn(II) will not oxidize. These samples are referred to as supported Mn(IV) materials.

In the case of H-ZSM-5 and the Fe and Mn coated natural zeolite (FMNZ), the Mn(IV) was then reacted with 2% 1,4-PDA resulting in the formation of Mn(VII) (as observed by the developed violet color) within two hours. In contrast, Ca-clay supported Mn(IV) took 4 hrs to develop the violet color while Mn(IV) supported on Na-saturated zeolite 13X did not show any change. The amounts of Ca2+ and Na+ present in the exchangeable sites of the clay and zeolite 13X are 0.1% and 11%, respectively. When the amount of PDA was increased to 4%, the clay changed to a violet color in <15 minutes. For violet color formation in zeolite 13X, the PDA concentration had to be increased to 6%, with the color forming in 24 hrs. Likewise, Mn(IV) supported on Na-ZSM-5 prepared from rice hull ash (Vempati, 2002) containing only 0.11% Na, took <30 min for the formation of Mn(VII). These preliminary studies showed that the presence of Ca2+ and Na+ ions decreased the availability of PDA for Mn oxidation. Therefore, H-exchanged clays ZSM 5 from rice hull ash should be preferably air dried and should possess the following advantages: 1) a decreased time for Mn(VII) preparation, and 2) significantly decreased support material cost, e.g., commercial H-ZSM-5 sells for $20,000 per ton.

Similarly, the increase or decrease of pH by the addition of NaOH or HCl to the PDA may also result in the formation of the univalent Mn(II), Mn(III), or Mn(VII) state or mixed oxidation states. In the mixed oxidation states, the resulting colors may by orange, yellow, maroon, greenish yellow, etc.

Mn(VII) oxide is a highly dispersed; therefore, filtration of this material is extremely difficult. Hence to remove excess PDA and Na ultracentrifugation or dialysis is suggested. The reacted suspension is transferred into dialysis tubing until the water ceases to be colored and the electrical conductance is lowered significantly. The product should be air dried or freeze dried.

Applicant's studies have shown that the washed samples can be treated with 0.01 M HCl to remove Na+ sorbed on the zeolite surfaces and dried at 100° C. overnight before use to improve the reactivity. The powdered samples should be stored in desiccators to prevent moisture sorption.

The Mn(II), Mn(III), and Mn(VII) formed by the reaction of PDA are stable when dry; however, in the presence of residual PDA in solution, changes of Mn oxidation occur upon extended storage.

The color changes of the solid supported Mn(VII) observed during redox reactions makes it possible to observe the consumption of the material. For example, discoloration occurs when the reagent has been spent. Furthermore, preliminary studies indicate that these oxidation states can be regenerated by addition of PDA.

Characterization:

A. X-ray diffraction (XRD):

No Mn-oxide peaks were observed for Mn(IV) and Mn(VII) supported on H-ZSM-5 indicating that the precipitated Mn oxide was amorphous in nature and/or small amounts of Mn oxide (<2%) on the zeolite surfaces precluded the observation of characteristic x-ray diffraction peaks. Similarly, clay-supported Mn(VII) and Mn(IV) did not show the presence of Mn oxides. The XRD of the clay slurry was at 14.6 Å [001] and no shift was observed for clay-supported Mn(VII), but for supported Mn(IV) the 001 peak was observed at 13 Å indicating a decrease in 'c' dimension.

B. Thermogravimetric analysis (TGA):

The thermogravimetric curves of H-ZSM-5 and clay supported Mn(VII) did not show any significant differences. Also, no weight loss was observed from 150° C. to 250° C. for the PDA treated samples, indicating complete removal of organics.

C. Fourier transform infrared spectroscopy (FT-IR):

Both H-ZSM-5 and clay supported Mn(VII) contained traces of NH deformations and C=N stretches at 1550 and 1300 cm$^{-1}$, respectively.

D. Thermal stability of supported Mn(VII):

H-ZSM-5 supported Mn(VII), clay supported Mn(VII), and clay supported KMnO$_4$ are stable up to 400° C. and retain their color. At 550° C., clay supported KMnO$_4$ turns to a brown/tan color in <60 minutes which may be due to formation of MnO$_2$. H-ZSM-5 and clay supported Mn(VII) are stable for up to 3 hrs at 550° C., retaining their violet color (Figure not shown). In contrast, supported materials in which the organics were not removed were considerably less stable at higher temperatures.

Application Studies of Supported Mn(III), Mn(IV), and Mn(VII):

A. Removal of mercaptan odors:

Preliminary testing revealed that supported Mn(VII) reagents oxidized 2-mercaptoethanol and removed the strong odor in aqueous and organic solvents. The three Mn(VII) compounds employed in the reactions were PDA-prepared H-ZSM-5, Fe-Mm coated natural zeolite (FMNZ) and KMnO$_4$ supported zeolite 13X. The Mn(VII)-coated H-ZSM-5 is 3.5% Mn by weight, and the FMNZ and KMnO$_4$-coated zeolite 13X are 0.1% and 1.5%<m respectively. The amounts of Mn(VII)-coated H-ZSM-5 and KMnO$_4$-coated zeolite 13X used in the reactions were varied to determine how much of the reagent was required to remove the odor. Also, samples were withdrawn at set time intervals to determine the length of time required for odor removal. The samples were analyzed using GC-MS to determine whether 2-mercaptoethanol was present, and in addition the samples were smelled to detect the presence of the mercaptan. A stock solution of 0.6 mL 2-mercaptoethanol 100 mL$^{-1}$ benzene was prepared and aliquots were removed for the reactions. The results of the reactions are shown in Table 1. In one experiment, 0.28 g of H-ZSM-5 supported Mn(VII) oxidized the mercaptan and removed the smell in 5 minutes. Reducing the amount of H-ZSM-5 supported Mn(VII) to 0.1 g caused the mercaptan to oxidize in 10 minutes. With 0.13 g of zeolite 13X-supported KMnO$_4$ it took 15 minutes to oxidize the mercaptan. It should be noted that only in certain cases was a product detected by GC-MS. The absence of GC-MS peak may be due to a highly involatile degradation product. For example, thiol can be oxidized to the corresponding sulfonic acids, which are typically non-volatile. To the other extreme, the degradation products could be quite volatile, in which case their signals would obscured by the solvent signals. For example, if the oxidizing agent cleaves the molecules into smaller molecules the volatility would increase. A 0.05 g sample of Mn(IV)-coated H-ZSM-5 (not treated with PDA) oxidized the mercaptan in 15 minutes, indicating that supported Mn(IV) reagents may be equally effective in this reaction.

TABLE 1

Removal of 2-mercaptoethanol using various solid-supported reagents:

| S. No. | Supported Reagent | Grams of supported reagent | mercaptan soln$^a$ mL | Odor Removal (min) | Product observed (GC-MS) |
|---|---|---|---|---|---|
| 1 | Mn(VII)-coated H-ZSM-5 | 0.28 | 10 | 5 | none |
| 2 | Mn(VII)-coated H-ZSM-5 | 0.1 | 10 | 10 | none |
| 3 | KMnO$_4$-Coated Zeolite 13X | 0.13 | 10 | 15 | 2,2'-dithiodiethanol |
| 4 | Mn(IV)-coated H-ZSM-5$^b$ | 0.05 | 5 | 15 | 2,2'-dithiodiethanol |
| 5 | Heated Mn(VII)-coated H-ZSM-5 | 0.05 | 5 | 30 | none |
| 6 | Heated KMnO$_4$ coated clay | 0.05 | 5 | 30 | 2,2'-dithiodiethanol |

$^a$The mercaptan solution was prepared by adding 0.6 mL of 2-mercaptoethanol to 100 mL of benzene.
$^b$This reagent was not treated with PDA.

Furthermore, a series of $^1$H NMR spectroscopy experiments were performed to further investigate the removal of mercaptan malodors which may not have been detected by GC-MS. The compound chosen for study was 2-mercaptoethanol. The $^1$H NMR spectrum of 2-mercaptoethanol in D$_2$O is shown in FIG. 1(a). After treatment of the 2-mercaptoethanol solution with either Mn(VII)-coated H-ZSM5- or KMnO$_4$—coated zeolite 13X, the odor disappeared. The resultant $^1$H NMR spectra are shown in FIGS. 1(b) and (c), respectively. The $^1$H NMR spectrum of 2-hydroxyethyldisulfide, a product of the known oxidative coupling of 2-mercaptoethanol, is shown in FIG. 1(d). Clearly, treatment of 2-mercaptoethanol with Mn(VII)-coated H-ZSM5- or KMnO$_4$-coated zeolite 13X results in conversion of 2-mercaptoethanol to 2-hydroxyethyldisulfide, a sweet smelling compound. An equation describing this transformation is shown below.

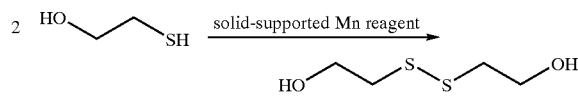

Therefore, GC-MS and NMR studies indicate that in case of Mn(VII)-coated H-ZSM5 only 2-hydroxyethyldisulfide was detected, which is further confirmed by sweet or fruity odor; whereas, KMnO$_4$-coated zeolite 13X resulted in formation of 2,2'-dithiodiethanol and 2-hydroxyethyldisulfide.

B. Use of calcined reagents:

On heating samples of Mn(VII)-coated HZSM-5 and KMnO$_4$-coated 13X at 550° C. for three and one hour, respectively, and the samples turned grey/brown in color indicating a change in oxidation state from Mn(VII) to Mn(IV). These reagents also proved to be effective in removing 2-mercaptoethanol from solution, although the time required for complete reaction to occur was slightly longer (See Table 1).

C. Reaction with other sulfur-containing compounds:

The reaction of KMnO$_4$-coated zeolite 13X with hyposulfite resulted in a color change from violet to brown to colorless. In the case of Mn(VII) supported on H-ZSM-5 the color changed from violet to tan brown. This color change is attributed to the reduction of Mn(VII) to Mn(IV). Similarly, reacting a Mn(III)-coated clay with hyposulfides resulted in a color change from turquoise to cream (the original color of the clay) resulting from reduction of Mn(III) to Mn(II). Also, reacting Mn(VII)-coated H-ZSM-5 with Fe(II) resulted in the violet color changing to brown, indicating a reduction of Mn(VII) to Mn(IV). Moreover, Fe(III) may contribute to this color. A greenish tint was also observed in the sample indicating that a portion of Mn(VII) was reduced to Mn(IV).

D. Hazardous Chemical Removal:

Preliminary studies indicate that PDA compounds are destroyed by Mn(IV)-containing solid support at room temperatures. The consumption of PDA during the preparation of Mn(VII) was observed using 400 MHz $^1$H NMR spectroscopy techniques. A known concentration of 1,4-PDA was prepared in D$_2$O and the $^1$H NMR spectrum of this solution was measured (FIG. 1a). The identical concentration of 1,4-PDA/D$_2$O solution was prepared and utilized to synthesize ZSM5-supported Mn(VII) in two separate experiments. The reaction mixtures were filtered through Celite and glass wool, and $^1$H NMR spectra were obtained of the filtrates. In both cases, the concentration of PDA was clearly diminished compared to the standard, confirming that PDA was being consumed in the reaction (FIGS. 1b and 1c). Synthesis of clay-supported Mn(VII) also resulted in considerably diminished levels of 1,4-PDA. No other peaks were present in the $^1$H NMR spectra, suggesting that either the PDA is bound to the solid support in some fashion or is being converted to an organic product which is insoluble in the highly polar D$_2$O. The degraded products appear to be organic in nature but the exact identity of the by-products was not determined.

Advantages of the Invention:

The present invention offers a number of advantages in the preparation of of Mn(II), Mn(III), Mn(IV), and Mn(VII) on solid supports, and to the use these solid supported oxidation states of Mn in various industrial applications. The above application studies reveal particular advantages of Mn(VII) supported on H-ZSM-5 or FMNZ over zeolite-supported KMnO$_4$. Firstly, the Mn(VII) supported material degrades mercaptan to disulfide compounds in contrast to dithiodiethanol by KMnO$_4$ supported zeolite 13X. Further, the 2-hydroxyethyldisulfide compound has sweet to no odor; whereas; 2,2'-dithiodiethanol has residual malodor. Secondly, KMnO$_4$ supported on zeolites easily dissolves in water. Also, the use of zeolite-supported KMnO$_4$ will affect the aesthetic qualities of water due to the observed pink coloration.

The maximum amount of free MnO$_4^-$ that can be loaded on zeolite depends on the cation exchange capacity (CEC) of the zeolite. Applicants have previously demonstrated that the oxidation of an alcohol to a ketone in benzene by KMnO$_4$-coated material is dependent on the cation exchange capacity (CEC) of the support. For example, KMnO$_4$-coated zeolite 13X (CEC=450 cmol kg-1) was the best oxidant and KMnO$_4$-coated sand (CEC=5 to 10 cmol kg-1) was least reactive. This is likely due to the fact that more K+ is absorbed into the zeolite 13X exchange sites (compared to sand), resulting in the presence of more MnO$_4^-$ (Vempati and Son, unpublished). Therefore, one disadvantage of KMnO$_4$-coated support is that materials with high CEC must be used to insure high reactivity. High CEC materials are also relatively expensive; for example, zeolite 13X costs approximately $800 per ton at the present time.

The consumption of Mn(VII) supported on H-ZSM-5 can be monitored by color change. A further advantage of the method of the invention is that Mn(VII) supported on H-ZSM-5 can be regenerated by adding PDA. The color changes and regeneration of Mn(VII) supported on H-ZSM-5 will make this technology attractive to potential users. The regeneration of the spent material makes products prepared according to the method of the invention competitive with existing technologies with a resulting cost savings to end users.

The technology developed from the above described invention will have influence not only in odor control in industrial waster water treatment and municipal water treatment but in other odor pollution control markets, such as scrubbing of H$_2$S, AsH$_3$, and SO$_2$ present in gases, sweetening of sour oil reefing waste waters that contain high concentration of mercaptans, elimination of excess rocket fuel (N$_2$H$_2$), and corrosion control in sanitary sewers. Furthermore, unlike KMnO$_4$-coated zeolite where the permanganate ion is soluble in water, Mn(VII)-coated H-ZSM-5 will be insoluble. This thereby avoids the release of Mn(VII) into water, a critical factor when considering that utilities have to meet the secondary Mn level of 50 ppb or less in drinking water. The observable color changes of the oxides during the oxidation of mercaptans/sulfides and reduction of Mn, will be another major advantage. Furthermore, preliminary studies have shown that PDA compounds are also destroyed by the Mn(IV)-containing solid support at room temperature. Therefore, potential exists to market this technology to industries generating amines.

While the invention has been shown in only one of its forms, it is not thus limited but is susceptible to various changes and modifications without departing from the spirit thereof.

What is claimed is:

1. A method of producing stabilized Mn(VII), the method comprising the steps of:

adding a selected solid support material to Mn(II) in solution;

allowing Mn(IV) or Mn(III) oxide to form from the Mn(II) in the above solution;

precipitating the Mn(IV) or Mn(III) from the above Mn(II) solution onto the solid support material and drying the resulting product to produce a supported Mn(IV) or Mn(III) material;

reacting the supported Mn(IV) or Mn(III) material with an amine to form solid supported Mn(VII), the amine having the general formula $R(NH_2)_n$, representing a mono- or multi-amine-substituting organic compound where $n \geq 1$, and R=an alkyl or arylorganic moiety.

2. The method of claim 1, wherein the amine which is reacted with the supported Mn(IV) or Mn(III) material to form the solid supported Mn(VII) is phenylenediamine.

3. The method of clam 1, wherein the solid support material is selected from the group consisting of hydrophobic zeolites, hydrophilic zeolites, clays, H-saturated zeolites, Fe—Mn coated natural zeolite (FMNZ), and H-saturated clays.

4. The method of claim 1, wherein an H-saturated solid support material is added to Mn(II) in solution, followed by raising the pH of the solution to thereby form precipitated Mn oxide on the solid support.

5. The method of claim 1, wherein the solid supported Mn(VII) is reacted with an acid and then dried to improve reactivity.

6. The method of claim 1, wherein the solid supported Mn(VII) is reacted with a sulfur containing compound in order to neutralize the sulfur containing compound.

7. The method of claim 1, wherein the solid supported Mn(VII) is added to a solution containing a mercaptan in order to oxidize the mercaptan.

8. The method of claim 1 further comprising the steps of calcining the solid supported Mn(VII) followed by reacting the calcined solid supported Mn(VII) with a sulfur containing compound in order to neutralize the sulfur containing compound.

9. The method of claim 1, wherein the solid supported Mn(VII) is reacted with an undesirable compound in order to neutralize the undesirable compound and the progress of the neutralization reaction is monitored by monitoring any color change in the solid supported Mn(VII) material.

10. The method of claim 9, wherein the reaction is allowed to proceed until the solid supported Mn(VII) material is spent, followed by regenerating the solid supported Mn(VII) material by reacting the material with a suitable amine.

11. The method of claim 1, wherein the solid supported Mn(VII) material is used to remove amines from the environment by reacting the solid supported Mn(VII) with the amine at room temperature.

12. A method of producing stabilized Mn(VII), the method comprising the steps of:

adding an H-saturated solid support material to Mn(II) in solution;

raising the pH of the solution above about 12.0 to form Mn oxide, the Mn oxide being observable as a brown coloration in suspension;

precipitating the Mn oxide from the solution onto the solid support material and drying the product to produce a supported Mn oxide material;

reacting the supported Mn oxide material with phenylenediamine to form solid supported Mn(VII), the formation of the solid supported Mn(VII) being indicated by an observed violet color formation in the material so formed.

13. A method of preparing Mn(II), the method comprising the steps of: adding 1,2-phenylenediamine dihydrochloride to a starting material selected from the group consisting of Mn-containing clay as received from a mine site, clay coated with Mn oxide and zeolite coated with Mn oxide in water suspension;

precipitating and drying the resulting Mn(II) oxide.

14. A method of preparing Mn(III), the method comprising the steps of:

adding 1,4-phenylenediamine dihydrochloride to a starting material selected from the group consisting of Mn-containing clay as received from a mine site clay, coated with Mn oxide and zeolite coated with Mn oxide in water suspension;

precipitating and drying the resulting Mn(III).

15. A method of producing Mn(II) from stabilized Mn(VII), the method comprising the steps of:

adding a selected solid support material to Mn(II) in solution;

precipitating Mn oxide from the solution onto the solid support material as Mn solid supported material and drying the resulting product;

reacting the supported Mn product with an amine to form solid supported Mn(VII), the amine having the general formula $R(NH_2)_n$, representing a mono- or multi-amine-substituting organic compound where $n \geq 1$, and R=an alkyl or arylorganic moiety; and thereafter bubbling ozone or $H_2O_2$ into a solution containing the solid supported Mn(VII) to thereby form Mn(II).

16. A method of producing stabilized Mn oxide, the method comprising the steps of:

adding a selected solid support material to Mn(II) in solution;

precipitating Mn oxide from the solution onto the solid support material and drying the resulting product to produce a supported Mn oxide material; and wherein an H-saturated solid support material is added to Mn(II) in solution and precipitated to form supported Mn oxide material, followed by increasing or decreasing the pH of the solution by the addition or a suitable acid or base, respectively; and thereafter reacting the Mn oxide material with a selected one of 1,2-PDA, 1,4-PDA, HCl and 1,4-PDA , to thereby form a selected one of the Mn(II), Mn(III) or Mn(VII) oxide states or mixed Mn oxidation states.

17. The method of claim 16, wherein the mixed oxidation states which are formed have distinctive colors which make them identifiable.

18. A method of producing Fe—Mn coated zeolite, the method comprising the steps of:

treating a dried zeolite starting material with a mixture of Fe—Si—Mn in solution to produce a suspension;

drying the suspension to thereby produce a Fe—Mn coated zeolite with adsorbed silica.

19. The method of claim 18, wherein the dried zeolite starting material is selected from the group consisting of natural zeolites and synthetic zeolites.

20. The method of claim 18, wherein the oxidation state of the Mn in the Fe—Mn coated zeolite is three.

21. The method of claim 18, wherein the Fe—Mn coated zeolite so produced is further reacted with phenylenediamine solution to produce Mn(VII).

* * * * *